(12) United States Patent
Horz

(10) Patent No.: US 11,572,205 B2
(45) Date of Patent: Feb. 7, 2023

(54) TOOL AND METHOD FOR CLOSING A CONTAINER AND METHOD FOR PRODUCING A CONTAINER WITH SEVERAL COMPARTMENTS

(71) Applicant: Ardagh MP Group Netherlands B.V., AH Deventer (NL)

(72) Inventor: Peter Horz, Kisselbach (DE)

(73) Assignee: Ardagh MP Group Netherlands B.V., Deventer (NL)

( * ) Notice: Subject to any disclaimer, the term of this patent is extended or adjusted under 35 U.S.C. 154(b) by 492 days.

(21) Appl. No.: 16/479,496

(22) PCT Filed: Jan. 22, 2018

(86) PCT No.: PCT/IB2018/050382
§ 371 (c)(1),
(2) Date: Oct. 18, 2019

(87) PCT Pub. No.: WO2018/134794
PCT Pub. Date: Jul. 26, 2018

(65) Prior Publication Data
US 2020/0094998 A1    Mar. 26, 2020

(30) Foreign Application Priority Data
Jan. 20, 2017 (DE) .................. 10 2017 101 150.1

(51) Int. Cl.
*B65B 7/28* (2006.01)
*B29C 65/00* (2006.01)
*B65D 51/22* (2006.01)

(52) U.S. Cl.
CPC .......... *B65B 7/2807* (2013.01); *B65B 7/285* (2013.01); *B29C 66/8322* (2013.01);
(Continued)

(58) Field of Classification Search
CPC ....... B65B 7/2807; B65B 7/285; B65D 51/22; B65D 2251/0093
(Continued)

(56) References Cited

U.S. PATENT DOCUMENTS 1,888,397 A * 11/1932 Slick ...................... B21D 51/50
53/362
2,204,594 A * 6/1940 Hogg ......................... B67B 1/10
53/352
(Continued)

FOREIGN PATENT DOCUMENTS

CN          1926025 A       3/2007
CN        200978016 Y      11/2007
(Continued)

OTHER PUBLICATIONS

The International Search Report for related PCT/IB2018/050382 dated Sep. 3, 2018.
(Continued)

*Primary Examiner* — Robert F Long
*Assistant Examiner* — Xavier A Madison
(74) *Attorney, Agent, or Firm* — Troutman Pepper Hamilton Sanders LLP

(57) ABSTRACT

The present invention relates to the technical field of packaging technology. One or a plurality of membranes is to be sealingly attached to an inner surface of a container making use of a small number of working steps. For this purpose, a tool comprising a force transmission unit (10), a deflection unit (20) and a positioning element (30) is suggested. The force transmission unit (10) is coupled to the deflection unit (20) and the positioning element (30), so that a force can be transmitted from the force transmission unit (10) to the deflection unit (20) and/or the positioning element (30). At least a portion of the deflection unit (20) is deflectable with
(Continued)

a radial component. The positioning element (30) is adapted to allow a flow of gas therethrough, so as to pick up and hold the membrane (33).

19 Claims, 8 Drawing Sheets

(52) U.S. Cl.
CPC ...... *B65D 51/22* (2013.01); *B65D 2251/0018* (2013.01); *B65D 2251/0093* (2013.01)

(58) Field of Classification Search
USPC .................................................. 53/432, 330
See application file for complete search history.

(56) References Cited

U.S. PATENT DOCUMENTS

| | | | | |
|---|---|---|---|---|
| 2,266,948 A | | 12/1941 | Barbieri | |
| 2,423,965 A | * | 7/1947 | Coyle | B29C 66/545 493/108 |
| 2,626,581 A | * | 1/1953 | Almgren | B21D 51/38 413/27 |
| 2,692,709 A | * | 10/1954 | Aldo | B65D 25/42 222/566 |
| 3,629,989 A | | 12/1971 | Gunter | |
| 3,868,808 A | | 3/1975 | Richard | |
| 4,000,708 A | * | 1/1977 | Hardt | B65B 7/285 29/523 |
| 4,293,354 A | * | 10/1981 | Haas | B65B 7/2878 29/523 |
| 4,549,389 A | | 10/1985 | Zichy | |
| 4,599,123 A | * | 7/1986 | Christensson | B29C 66/9241 229/5.8 |
| 4,640,733 A | * | 2/1987 | Bogren | B65B 7/2878 156/380.2 |
| 4,724,654 A | * | 2/1988 | Dahlin | B29C 66/131 53/330 |
| 4,989,394 A | * | 2/1991 | Berg | B29C 66/8322 53/330 |
| 2002/0062627 A1 | | 5/2002 | Esnault | |
| 2004/0206048 A1 | | 10/2004 | Iuchi et al. | |
| 2012/0036815 A1 | * | 2/2012 | Holzem | B65D 1/26 53/488 |
| 2019/0256230 A1 | * | 8/2019 | Holka | B65B 31/00 |

FOREIGN PATENT DOCUMENTS

| | | |
|---|---|---|
| CN | 201065184 Y | 5/2008 |
| DE | 2404197 A1 | 7/1975 |
| EP | 0247986 A1 | 12/1987 |
| EP | 2782837 B1 | 1/2017 |
| GB | 1073763 A | 6/1967 |
| GB | 1499206 A | 1/1978 |
| GB | 1502962 A | 3/1978 |
| JP | 2000095430 A | 4/2000 |
| RU | 2611156 C2 | 2/2017 |
| SU | 623504 A3 | 9/1978 |
| SU | 648073 A3 | 2/1979 |
| SU | 1609439 A3 | 11/1990 |
| UA | 44028 A | 1/2002 |
| WO | 199404507 A1 | 11/1984 |
| WO | 9631406 A1 | 10/1996 |
| WO | 2010049589 A1 | 5/2010 |

OTHER PUBLICATIONS

The Written Opinion for related PCT/IB2018/050382 dated Sep. 3, 2018.
The International Preliminary Report on Patentability for related PCT/IB2018/050382 dated Jul. 23, 2019.

* cited by examiner

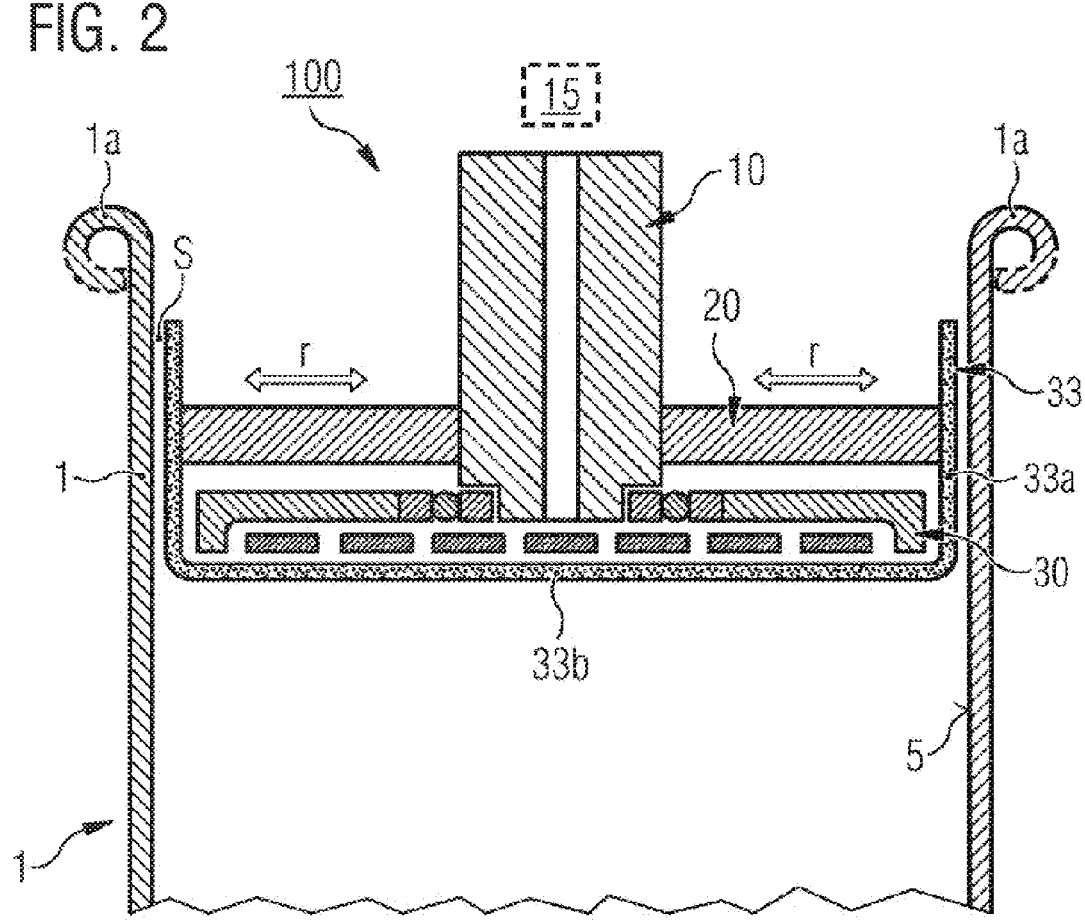

TOOL AND METHOD FOR CLOSING A CONTAINER AND METHOD FOR PRODUCING A CONTAINER WITH SEVERAL COMPARTMENTS

The present invention relates to the technical field of packaging technology. In particular, the present invention relates to the field of sealing one or a plurality of membranes in a container.

WO 1996/31406 discloses a can made of sheet metal, which is sealed on one side thereof with a membrane. For attaching a membrane to the inner surface of a can, the membrane is placed on the can in a first step. Subsequently, a spreading device is inserted into the can above the membrane in a second step and a collar of the membrane is fixedly connected to the inner surface of the can by spreading the spreading device, optionally under the influence of heat. For holding the membrane in a fixed axial position of the can before the spreading device is inserted, two solutions are suggested. The upper edge of the can may be provided with an adhesive, so that the membrane will remain at a specific position after insertion into the can (WO 96/31406, page 4, lines 29 to 31). Alternatively, it is suggested to shape the membrane in a V-shape, so that it 21) deviates from a cylindrical shape (membrane with membrane collar). The upper diameter of the membrane is then larger than the can diameter, so that, after having been attached by a suction gripper, the upper collar area of the membrane is held on the upper side of the can in frictional engagement therewith (WO 96/31406, page 5, lines 6 to 8). A collar, there 6, can additionally hold the membrane, there 5, exactly in position in the opening of the can. By means of a stamp without a suction gripper, there 8, 9 and FIG. 4, the membrane is then pushed further down into the can, whereby the membrane collar deforms and the membrane assumes a substantially cylindrical shape. The upper area of the membrane collar rests here against the inner surface of the can and the membrane is held in position before the spreading device attaches the membrane collar N, to the inner surface of the can, as described above.

US 2004/0206048 A1 discloses an apparatus for attaching a lid to the inner surface of a container. The apparatus comprises a lid suction member (there 74) allowing a flow therethrough.

It is the object of the present invention to sealingly attach one or a plurality of membranes to an inner surface of a container making use of a small number of working steps.

This object is achieved by a tool, by a method for attaching a membrane to an inner surface of a container and by a method for producing a container with more than one compartment.

A tool for attaching a membrane (also referred to as "foil") to an inner surface of a container (e.g. a can) comprises a force transmission unit, a deflection unit and a positioning element. The force transmission unit is coupled to the deflection unit and the positioning element. The coupling is configured such that a force can be transmitted between the force transmission unit and the deflection unit and/or the positioning element. At least one portion of the deflection unit is deflectable with a radial component. The positioning element is adapted to allow a flow of gas (also: fluid) therethrough, whereby the membrane can be picked up and held.

When at least one portion of the deflection unit is deflected, the deflecting movement of the portion has a radial component. This means that, in addition to a radial component, a the movement may also comprise an axial component and/or a circumferential component.

Preferably, at least one portion of the deflection unit is deflectable from the container interior in the direction of the container inner surface (the container wall). The gas, which can flow through the positioning element through at least a lateral section thereof, is e.g. air.

The force transmission unit may be connected to the deflection unit in a rotationally fixed manner. Hence, they both rotate in common relative to the container to be closed. What matters is the relative movement that takes place in a circumferential direction. Nevertheless, a part of the deflection unit can be extended out from the rest of the deflection unit along a path, the path comprising at least a radial component.

The force transmission unit may be rotatably connected to the positioning element. Especially, the force transmission unit is rotatably connected to the positioning element by means of at least one roller bearing or at least one plain bearing. In particular, the rotatable connection between the force transmission unit and the positioning element is configured as at least one ball bearing.

Preferably, the positioning element has an interior, which is adapted to allow a flow of gas therethrough.

The volume of the interior may be small, especially smaller than 0.2 L, preferably smaller than 0.1 L and particularly preferred smaller than 0.05 L.

The positioning element may have at least a first opening through which the interior of the positioning element is open up to the surroundings, viz. open in the direction of the membrane that can be picked up and held by the positioning element. This will normally be (axially) below the positioning element.

Preferably, the positioning element comprises at least a second opening through which the interior of the positioning element is in fluid communication, e.g. for a gas such as air, with the force transmission unit. Especially, the interior of the positioning element is in fluid communication with a channel of the force transmission unit via a second opening. The second opening opens into the axial channel.

The positioning element may allow a flow therethrough starting from a flow source. The flow source is preferably in fluid communication with the positioning element via a channel of the force transmission unit.

The positioning element may be made of plastic. This does not necessarily mean fully and completely. It means an essential part, e.g. more than 80% of the volume.

Especially, the positioning element may be made of a material which cannot be heated by inductive heating.

The plastic material used may e.g. be a thermoplastic or a thermoplastic composition, especially a composition comprising polypropylene.

The positioning element may have a height (axial extension) of less than 50 mm, preferably less than 30 mm, particularly preferred between 5 mm and 20 mm. It may resemble a very flat cylinder.

The deflection unit and the positioning element may be rotatable relative to each other. Thus, the positioning element holds the membrane in the opening of the container and the deflection unit is able to rotate relative to the collar of the membrane for sealingly fixing the membrane to the inner surface of the container wall.

The deflection unit is here rotatable relative to the positioning element, if the deflection unit is rotatable and the positioning element is not able to execute a relative rotation, or if the positioning element is rotatable and the deflection unit is not able to rotate, or if the deflection unit and the positioning element are rotatable (in each case in relation to the surroundings).

The above-mentioned relative movements of the deflection unit and the positioning element will be explained later. There are a plurality of objects that can be caused to execute a circumferential movement.

The container itself can be rotated. Likewise, the force transmission unit can be rotated, or the positioning element and/or the deflection unit. In view of the fact that a tool as such is claimed, which cannot be described or characterized by its behavior with respect to the object it is working with, the relative movement must be explained in a tool internal manner. That which may perhaps appear to be more easily comprehensible will then result from the outward effect. The collar of the membrane is to be attached to the inner surface of the container wall. These two objects will not rotate, at least not relative to each other, when they are being fixed to each other, i.e. when an airtight closure is being established by means of an adhesive or by means of sealing. It follows that, if the container rotates, also the membrane will have to rotate at the same angular speed as the container. The positioning element is here rotatable. In order to generate the radial pressure for closing and attaching the membrane to the inner wall, the deflection unit with its at least one, or preferably several portions, which are deflectable with a radial component, remains stationary, i.e. it does not take part in the movement. The other model or the other embodiment is so conceived that the container does not rotate, i.e. it is stationary in a circumferential direction. In this case, the positioning element and the membrane held thereby will not move circumferentially either. However, in order to allow the membrane with its membrane collar to be attached to the inner surface of the container, i.e. to an upper portion or to a portion on a lower level, as will be explained hereinafter, the deflection unit with its at least one, preferably several portions that are deflectable will move. Also that it is not the deflection unit that rotates, but the portions of this deflection unit which are deflectable with a radial component. e.g. rollers.

Preferably, however, the rollers are moved in a circumferential direction due to the fact that the deflection unit itself is moved and the portions of the latter are deflectable with the above-mentioned radial component (or also other components in a circumferential direction). This leads to the formation of the sealing line on the container wall because the positioning element, the membrane to be sealingly attached and the container do not move in a circumferential direction. In the final analysis, it is also imaginable that both the container and the deflection unit move, but not at the same angular speeds, but in such a way that a differential movement results, the deflection unit as well as the positioning element being nevertheless each rotatable, or are rotated, in relation to the surroundings. The difference in speeds in the circumferential direction allows the membrane collar of the membrane to be sealingly fixed to the inner surface of the container wall by means of the deflection unit (its deflectable portions).

It follows that, described by tool-oriented terms, all three options are possible, oriented according to the following two criteria the site where the membrane collar is fixed to the container must not rotate relative to the collar;
a part of the deflection unit must move circumferentially relative to the above-mentioned fixing site (nota bene, relative thereto, i.e. the one or the other) so as to allow fixing in a sealing manner, since the latter is fulfilled by the sealing seam or the adhesive seam on the membrane collar.

The positioning element may be porous, at least sectionwise. Especially, the positioning element consists, at least sectionwise, of a sintered material.

Specifically, the sintered material consists of ceramic r metal. Preferably, the positioning element has a maximum width (in a laterally extending plane perpendicular to the axial direction) of less than 300 mm. Preferably, the maximum lateral extension of the positioning element is smaller than 200 mm, particularly preferred smaller than 120 mm, even more preferred between 50 mm and 120 mm.

The deflection unit may comprise at least one roller that is deflectable.

Preferably, a plurality of rollers for pressing the collar of the membrane against the inner surface of the container are arranged on the deflection unit in circumferentially spaced relationship with one another.

Especially, the at least one roller is deflectable with a radial component.

The roller(s) may have a substantially constant circumferential dimension, the maximum height being, however, 30 mm. Preferably, the height of the roller portion having a constant cross-section is not more than 20 mm, particularly preferred between 3 mm and 15 mm, even more preferred between 4 mm and 10 mm. The rollers are pressure rollers for the membrane collar, no folding rollers used for sheet metal hemming. Therefore, they do not have a circumferential groove, but a clearly axially extending cylindrical surface as an outer wall.

The at least one roller or all the rollers need not have a constant cross-section over their entire axial height. When the roller, as a portion or part of the deflection unit, is deflected, the radial outermost part of the at least one roller enters into contact with the membrane (its projecting collar), so that the membrane will be pressed against the inner surface of the container in this area. This press-on area preferably has the above-described height of not more than 30 mm, especially not more than 20 mm, preferably between 3 mm and 15 mm, particularly preferred between 4 mm and 10 mm.

The positioning element is preferably plate-shaped. The positioning element may be round in shape. The positioning element may, however, also be oval or elliptical. The term "circumferentially", which has been used, should not be read like a mere $\Phi$ component of a cylinder coordinate.

The positioning element may have a plurality of openings that extend in the direction of the membrane, which can be picked up and held by the positioning element.

The openings may be holes, in particular round holes, slots, especially curved slots, or openings formed on the basis of an irregular pore structure.

The deflection unit may comprise a plurality of rollers as "deflectable portions". Preferably, the plurality of rollers of the deflection unit are evenly circumferentially distributed. Particularly preferred are two rollers, three rollers, four rollers, five rollers, seven rollers or eight rollers.

The deflection unit may be disk-shaped. Especially, the deflection unit need not have segments that are displaceable relative to one another. Instead, it moves in a circumferential direction relative to the collar of the membrane.

The force transmission unit may be a hollow shaft. The hollow shaft may comprise an axial channel, which ends in the interior of the positioning element and which, on the opposite end, is connected to a flow source that is capable of generating a vacuum.

In a method of attaching a membrane (or a foil) to an inner surface of a container, a tool may be used. The tool comprises a force transmission unit, a deflection unit and a positioning element. According to the method, the container including the inner surface is provided, a membrane is picked up and held by the tool, the tool with the membrane attached thereto is introduced in the container. After having reached the axial target position in the container, at least one portion of the deflection unit is deflected such that a portion of the membrane will rest against both the deflected portion of the deflection unit and a portion of the inner surface of the container; subsequently, the membrane can be fixed circumferentially to the axial portion of the inner surface of the container, The deflected portion of the deflection unit is then returned to the non-deflected position and the tool is retracted from the container without the membrane that has been fixed to the inner surface of the container in an airtight manner.

According to the method claimed, the membrane can be picked up and held by the positioning element of the tool. An intermediate step, in which the membrane is to be fixed to the upper edge area of the container "in a suspended condition", can be dispensed with, cf. WO 1996/31406, page 4, lines 30/31. This task is fulfilled by the positioning element according to the present invention, which is able to hold the membrane independently in the container opening and which thus allows axial positioning.

Starting from a flow source, a flow can pass through the positioning element, so as to pick up and hold the membrane. This holding is a kind of "free holding" without the support of the container wall being necessary, i.e. neither a membrane hook on the upper end of the membrane collar, nor a separate adhesive for "positioning", nor a conical widening of the membrane collar causing a "frictional engagement". Preferably, the external dimension of the positioning element is dimensioned such that a gap to the inner surface of the container (inner surface of the container wall) will remain, even if the membrane collar is located in between, i.e. also in the gap.

The force transmission unit may comprise a channel, the channel establishing fluid communication between the flow source and the positioning element.

The positioning element may have an interior. When the membrane has been picked up by the tool, especially by the positioning element of the tool, a vacuum may prevail in the interior of the positioning element, so that the membrane will be held by the vacuum (alone). After the deflection of the deflection unit or its return to the non-deflected position, the pressure in the interior of the positioning element may preferably be raised at least up to the ambient pressure, the membrane being thus no longer held by the tool, in particular the positioning element of the tool. The membrane is released, or detached from the tool, since it sealingly rests against the inner surface of the container and "is held" thereby.

Vacuum means that the pressure is below the ambient pressure. Preferably, the pressure is at least 0.05 bar (5 kPa) below the ambient pressure, particularly preferred at least 0.1 bar (10 kPa) below the ambient pressure, even more preferred at least 0.3 bar (30 kPa) below the ambient pressure.

The deflection unit may comprise at least one roller. In particular, the at least one roller has a portion of substantially constant cross-section with a height of not more than 30 mm, preferably not more than 20 mm, particularly preferred between 3 mm and 15 mm, even more preferred between 4 mm and 10 mm. It may be a cylindrical pressure roller, preferably a plurality of circumferentially spaced pressure rollers.

The portion of "substantially" constant cross-section allows a deviation of up to 30% in comparison with a portion of constant cross-section, preferably of up to 20%, even more preferred of up to 10%. This also applies to other rollers having a portion of "substantially" constant cross-section disclosed in the present context. Reference is a made to the explanations with respect to a deflection unit comprising at least one roller as a deflectable portion of the deflection unit.

Between the deflection of the deflection unit and its return to the non-deflected position, a "relative rotation" may take place at least between the deflection unit and the positioning element. This rotation means that the deflection unit moves relative to the positioning element.

A relative rotation between the deflection unit and the positioning element can be generated by a rotation of the deflection unit without any rotation of the positioning element or by a rotation of the positioning element without any rotation of the deflection unit. A rotation of the deflection unit and of the positioning element (each relative to the surroundings) at the same angular speed is excluded. A rotation is, however, possible, when the angular speeds are different. As regards the understanding of the term relative rotation in the sense of a circumferential differential movement, reference is here again made further up in the description. Within the scope of claiming the method, reference can. definitely be made to the membrane and its behavior relative to the container wall, since the membrane and its container are component parts of the working method. In addition, it can be explained in feature d) that a deflection of at least one portion of the deflection unit takes place such that the membrane will be sealingly fixed to the inner surface of the container. Such fixing will only be possible, if there is a circumferential movement, either that of the container with the membrane rotated relative thereto, or a rotary displacement in the sense of a rotation of the deflection unit with its deflection portions, while the container wall is standing still (which means that the membrane is standing still as well). In the final analysis, also the described possibility that all the elements rotate is here possible, as long as the latter do not rotate at identical speeds (as angular speeds).

Any of the tools disclosed may be used for the method for attaching a membrane to an inner surface of a container.

In a method for producing a container comprising more than one compartment, one of the tools may be used. The container includes a container inner surface. The tool comprises a force transmission unit, a deflection unit and a positioning element. According to the method, the container including the container inner surface is provided, a first membrane (or foil) is picked up and held by the tool, in particular the positioning element, the tool with the membrane is introduced into the container down to a certain axial depth, at least one portion of the deflection unit is deflected, thus causing an axial section of the first membrane to rest against the deflected portion of the deflection unit and a portion of the inner surface of the container, the first membrane is fixed to the portion of the inner surface of the container thus forming a compartment above and a compartment below the first membrane. The deflected portion of the deflection unit is returned to the non-deflected position and the tool is retracted from the container without the membrane.

Attaching a membrane to the inner surface of the container will create two compartments that can be filled. In order to close these compartments, so that the content in the respective compartment is protected against dropping out, the compartments may be secured by snap-on lids or press-in lids. In particular, the lower compartment may be secured (tightly closed) by crimping to a disk or plate, in particular made of metal, after having been filled with a filling product, e.g. with a foodstuff, preferably in granular or powder form.

Preferably, the first membrane is applied or fixed at an axial depth of not more than 70% of the total container height, more preferred at not more than 50% of the total container height, more preferably at not more than 30% of the total container height, even more preferred at not more than 20% of the total container height.

The axial distance between the attached membranes (if a plurality of membranes is used, as described below) is preferably not more than 30% of the total container height, more preferred not more than 20% of the total container height, more preferably not more than 10% of the total container height. The distance is measured between two respective membrane planes that are transverse to the axial direction of the container.

Each membrane is picked up and held by the positioning element of the tool and, while being held on the positioning element, lowered into the container by means of the tool and axially positioned, also at greater depths at a considerable distance from the container edge. "Considerable" means here more than 10% of the container height, i.e. at a location where placing of a closing foil can no longer be accomplished in the prior art, if also the upper edge of the container is required for axial positioning.

Starting from a flow source, a flow may pass through the positioning element, so that the membrane is picked up and held for axial positioning in the container body.

The force transmission unit may comprise a channel, the channel establishing fluid communication between the flow source and the positioning element.

Preferably, the channel is formed axially in the force transmission unit.

The positioning element may have an interior. When the membrane has been picked up by the positioning element of the tool, a vacuum prevails in this interior, so that the membrane will be held. In particular, the pressure in the interior of the positioning element of the tool will be raised at least up to the ambient pressure after the deflection of the deflection unit or its return to the non-deflected position, so that the membrane will no longer be held by the positioning element of the tool.

The deflection unit may comprise at least one roller according to the present method. The roller may have in a portion thereof an at least substantially constant diameter (cross-sectional portion) with a height of not more than 30 mm, preferably not more than 20 mm, particularly preferred between 3 mm and 15 mm, especially between 4 mm and 10 mm.

As regards the explanations concerning the portion of the at least one roller having a substantially constant cross-section, the above explanations are referred to. This also applies to the multiplication of the at least one roller that applies pressure to the membrane.

At least between the deflection of the deflection unit and its return to the non-deflected position, a relative rotation (circumferential relative movement) may take place between the deflection unit and the positioning element within the method.

This results in a relative rotation (circumferential relative movement) between the deflection unit and the positioning element, as has been explained hereinbefore.

According to the present method, a container comprising a plurality of compartments, e.g. 2, 3, 4 or more than 4 axially displaced compartments, can be produced. To this end, a plurality of membranes is attached to the inner surface of the container at a plurality of axial depths. For this purpose, a further membrane (second membrane) is picked up and held by the tool, when a first membrane has been attached to the inner surface of a container, the tool with the second membrane is introduced in the container down to a certain axial depth, at least one portion of the deflection unit is deflected, so that an axial section of the second membrane will rest against the deflected portion of the deflection unit and a portion of the inner surface of the container, the second membrane is fixed to the portion of the inner surface of the container, so that a further compartment will be formed above the second membrane, the deflected portion of the deflection unit is returned to the non-deflected position, and the tool is retracted from the container without the second membrane, The procedure may be repeated with further membranes.

In particular, a container, to the inner surface of which a membrane is to be fixed, may be provided as a hollow cylinder, two compartments, above and below the membrane, being thus formed when a membrane has been attached. By attaching another membrane to the inner surface of the container, the number of compartments will increase by 1. This means that two compartments (not necessarily closed compartments) will be formed by attaching one membrane, three compartments (one of them closed) will be formed by attaching two membranes, four compartments will be formed by attaching three membranes, etc. As a result, an uppermost compartment and a lowermost compartment, each of them open to the surroundings, are formed in the container. These two compartments can be closed by snap-on lids, press-in lids, or by crimping a plate or a disk (in short: lid), made in particular of metal.

Quite generally, a membrane that is to be attached to the inner surface of a container may comprise paper, plastic or aluminum, also in layers as a multilayer. The membrane may have a thickness of less than 1 mm, preferably less than 0.5 mm.

Quite generally, a container to which one or a plurality of membranes is to be attached may be made of metal, glass, paper, paperboard, cardboard or a composite material (e.g. a composite material consisting of the materials mentioned). The container may have a round basic shape. The container may also have an oval, elliptical or polygonal basic shape (preferably with more than three sides).

The embodiments of the present invention are illustrated by means of examples and not disclosed in a manner that transfers or reads restrictions from the figures into the claims. These examples are to be read and considered as examples even in the event that "by way of example", "in particular" or "e.g." is not used everywhere and in every place. Nor should the description of an embodiment be read such that there is no other embodiment or that other possibilities are excluded, if only one example is presented. These provisos should be read into the entire description following hereinafter.

FIG. 1 shows, in a sectional view, a tool 100 with a deflection unit 20.

FIG. 1*a* shows, in a sectional view, a tool 100 with a roller 21 as portion of a deflection unit 20.

FIG. 1*b* shows a roller 21 of the deflection unit 20 in detail.

FIG. 2 shows a container 1, into which a tool 100 with a membrane 33 has been introduced.

FIG. 2a shows a container 1, into which a tool 100 with a membrane 33 has been introduced, the deflection portion 21 of the deflection unit 20 being in the deflected condition.

FIG. 3 shows a container 1 with a membrane 33, connected to the inner surface 5 of the container 1, in an axial sectional view.

FIG. 4 shows, in a perspective view, a container 1 with a membrane 33 as a preshaped foil to be connected to the inner surface 5 of the container 1.

FIG. 5 shows, in an axial sectional view, a container 200 comprising a plurality of compartments 201, 201', 201", 201x.

FIG. 6 shows, in a perspective view, a container 200 with a plurality of membranes 233', 233x, which are connected (233') or are to be connected (233x) to the inner surface 205 of the container 200.

FIG. 7 shows, in a perspective view, a tool 100 with a positioning element 30 comprising a plurality of holes 80.

FIG. 8 shows, in a perspective view, a tool 100 with a positioning element 30 comprising a plurality of slots 90.

FIG. 1 shows a schematic view of a tool 100. A detailed representation of tools 100 is shown in FIGS. 7 and 8. The tool 100 in FIG. 1 comprises a force transmission unit 10, a deflection unit 20 and a positioning element 30.

The force transmission unit 10 is configured as a hollow shaft and comprises a channel 11. The schematically shown deflection unit 20 is shown in its basic position, at which at least one portion of the deflection unit 20 can be deflected radially in an r-direction, so as to arrive at a deflection position. From this deflection position, the deflection unit 20 can return to the basic position. The positioning element 30 is plate-shaped and has a round cross-section (perpendicular to the hollow shaft). The positioning element has a height 11 and a diameter D (largest width). The positioning element 30 has a plurality of openings 31, 31', 31", 31''' on its lower side (in a negative z-direction). On the upper side of the positioning element an opening 34 is provided, into which a channel 11 opens, which originates from the hollow shaft.

In this example, the force transmission unit 10 is connected to the deflection unit 20 in a rotationally fixed manner, so that, when the force transmission unit 10 rotates, the deflection unit 20 will rotate as well. The lower end (in a negative z-direction) of the force transmission unit 10 is coupled (or connected) to the positioning element 30 by a ball bearing 25, the force transmission unit 10 and the ball bearing 25 being positioned in the upper opening (second opening) 34 of the positioning element 30. Due to the connection of the positioning element 30 and the force transmission unit 10 via a ball bearing 25, a rotation of the force transmission unit 10 will not (at least not fully) be transmitted to the positioning element 30, so that the force transmission unit 10 is decoupled from the positioning element 30 with respect to the transmission of a substantial torque.

At the upper end, when seen in the positive z-direction, the channel 11 of the force transmission unit 10 is connected to the flow source 15. The flow source 15 is e.g. a (vacuum) pump.

The lower end of the channel 11 of the force transmission unit 10 is in fluid communication with an interior 32 of the positioning element 30, the interior 32 of the jo positioning element 30 being in fluid communication with the openings 31, 31', 31", 31'''.

If a flow is generated by the flow source 15, there will be a flow through the channel 11 of the force transmission unit 10, the interior 32 of the positioning element 30 and the openings 31, 31', 31", 31''' of the positioning element 30.

Through the creation of a vacuum in the flow source, there will be a flow through the openings 31, 31', 31", 31''' in the positive z-direction, whereby e.g. a membrane 33 can be suctionally attracted.

When a membrane abuts on the lower side of the positioning element 30 and when the openings 31, 31', 31", 31''' are sealed by the membrane 33 (in particular by a section 33b of the membrane 33), a further generation of vacuum in the flow source 15 will result in a vacuum in the interior 32 of the positioning element 30. This allows the membrane 33 to be picked up and held.

In FIG. 1a, the deflection unit 20 comprises a roller 21 having a height 112. The roller 21 has a constant cross-section (in an axial direction), so that a portion of substantially constant cross-section of the roller exists in the case of the entire height 112 of the roller 21 (constant diameter). The roller 21 (as part of the deflection unit 20) can be deflected radially by a motor M deflecting a rod 18, the roller 21 being coupled to the rod 18.

The roller 21 can be deflected radially to such an extent that it enters into contact with a section of the membrane collar 33a of the membrane 33 and, upon further deflection, pushes the section of the membrane collar 33a contacted by the roller 21 in the direction of the container wall 1' until the section of the membrane collar 33a rests against the container inner surface 5. In this case, the gap size s in the section of the membrane collar 33a resting against the container inner surface 5 is 0 (zero).

Rotation of the force transmission unit 10 (about its central axis) causes rotation of the deflection unit 20 and of the roller 21 (each about the central axis of the force transmission unit 10), since the deflection unit 20 is connected to the force transmission unit 10 in a rotationally fixed manner. When a membrane collar 33a of a membrane 33 rests against the radially outer portion of the roller 21, the roller 21 will roll along the contacted section of the membrane collar 33a, whereby the membrane 33 can be pressed via its membrane collar 33a against the inner surface 5 of a container 1 and attached thereto by means of an adhesive.

In so doing, at least one full rotation is executed (360 degrees). If a plurality of rollers 21 is arranged on the deflection unit 20, a partial rotation of the force transmission unit 10 and thus of the deflection unit 20 connected to the latter in a rotationally fixed manner may suffice, the necessary rotation angle resulting from the number of rollers by which the 360 degrees are to be divided. Even if a plurality of rollers 21 is used, one or a plurality of full rotations may be advisable. Each clamped section of the membrane collar 33a will then be contacted several times by a roller 21, i.e. pressed several times against the inner surface 5 of the container 1.

At least the membrane collar 33a of the membrane 33 may be coated with a sealing compound, an adhesive layer or a meltable polymer. During the deflection of the deflection unit 20 and, possibly, the rotation of the force transmission unit 10 and the deflection unit 20 (with or without roller 21), the clamped section of the membrane collar 33a is secured to the inner surface 5 of the container 1. This may also be done under the influence of heat, for example through induction, if the deflection unit 20 and/or the roller 21 is/are made of an inductively heatable material. Likewise, heating may be effected by a radiant heater or a hot element that contacts the deflection unit 20, the roller 21 or the container 1. The heat influence may also come from outside (through a the container wall).

FIG. 1b shows a detailed view of a roller 21 as a portion of a deflection unit 20. The roller 21 is coupled to a roller axle 17 at 21b such that. It is rotatable about its central axis, the roller axle 17 being guided by a cantilever 16a such that it is rotatable about its central axis A. The roller axle 17 may be deflected radially in the r-direction via a rod 18, by means of a motor M (as shown in FIG. 1a), or via a lifting device 19a (as shown in FIG. 7 and FIG. 8), (motor and lifting device not shown in FIG. 1b). The roller 21 may be provided with a rubber coating 21a on its radially outer portion, so as to increase the friction between the roller 21 and, if the roller 21 is radially deflected, a contacted ac section of a membrane collar 33a of a membrane 33. The rubber coating 21a may be formed over the entire height $H_2$ of the roller 21.

FIG. 2 shows a tool 100 with a force transmission unit 10, a deflection unit 20 and a positioning element 30. The tool 100 has here picked up a membrane 33 and holds it, as described above, by a vacuum in the interior 32 of the positioning element 30. The tool 100 with the membrane 33 has been inserted or introduced into a container 1. The container 1 has a round lateral cross-section. Also the membrane 33 has a round lateral cross-section. Unlike that which is shown in FIGS. 1a and b, the deflection unit 20 of the tool 100 does not have a roller 21. A portion of the deflection unit 20 or the deflection unit 20 may be configured as a snap ring or an expansion ring. A snap ring or an expansion ring for application in the field of the present invention is a component consisting of at least two segments, the segments being partially separated from each other, at least in the case of radial deflection. If the radially outer area of a snap ring or an expansion ring contacts a section of a membrane collar 33a, as shown in FIG. 2a, there will be at least two axially extending slots between the segments.

The diameter of the cross-section of the membrane 33 is slightly smaller than the diameter of the cross-section of the container 1, whereby a circumferentially extending gap s is formed between the membrane 33 and the container 1.

The gap s is preferably smaller than 1 mm, in particular smaller than 0.5 mm. Accordingly, the difference in diameter between the membrane 33 and the container 1 (inside) is twice the length of the gap s.

FIG. 2a shows the deflection unit 20 according to FIG. 2 in a deflected condition. Due to the deflection of the deflection unit 20 in the r-direction, a radially outer portion of the deflection unit 20 rests against a section of the membrane collar 33a of the membrane 33 and the membrane collar 33a of the membrane 33 rests against the inner surface 5 of the container 1. In other words, a section of the membrane collar 33a of the membrane 33 is clamped between the inner surface 5 of the container 1 and a radially outer area of the deflection unit 20. Between the clamped section of the membrane collar 33a of the membrane 33 and the inner surface 5 of the container 1 the gap s is 0.

Due to the application of pressure to a section of the membrane collar 33a, an upper section 33a" (seen in the positive z-direction) of the membrane collar 33a is obtained, in the area of which the distance between the membrane collar 33a and the container wall 1' (inner surface 5 of the container) is smaller than the gap size s prior to the application of pressure to a section of the membrane collar 33a. Within the section 33a", there is a section 33a', in which the membrane collar 33a rests against the inner surface 5 of the container. Typically, this section 33a' is slightly longer in an axial direction than the section of the membrane collar 33a against which the deflection unit 20 presses in its deflected condition.

In a section of the membrane collar 33a of the membrane 33 located further down (in a negative z-direction) the gap s has its original length, the gap size s, which was given before the deflection of the deflection unit 20.

When the fully circumferential section 33a' of the membrane collar 33a has been fixed to the inner surface 5 of the container 1, the deflection unit 20 can be returned to its non-deflected position, i.e. moved back to its initial position. After releasing the vacuum, the tool 100 can be removed or retracted from the container 1. The membrane 33 remains in the container 1.

The membrane 33 is held by the tool 100, e.g. by a vacuum in the interior 32 of the a positioning element 30, at the desired position (axial depth in the container 1) until a section of the membrane collar 33a has been fixed circumferentially to the inner surface 5 of the container 1 or until the deflection unit 20 returns from the deflected position to the non-deflected initial position. When the deflection unit 20 has been returned to the non-deflected position, the tool 100 can be retracted from the container 1. Releasing the membrane 33 from its hold on the tool 100 can be accomplished e.g. by increasing the pressure in the interior 32 of the positioning element 30 up to at least the ambient pressure.

FIG. 3 and FIG. 4 show a container 1 with a membrane 33 without a tool 100. FIG. 3 shows a metallic can with a flared rim 1a, the membrane 33 being arranged in the interior of the container 1 and the membrane collar 33a being connected to the inner surface 5 of the container 1. FIG. 4 shows the metallic container 1 in a perspective view. The membrane 33 has here not yet been lowered into the container 1. The membrane 33 comprises a tab 40 that can be used for removing the membrane from the fixed condition in the container 1 (access to the container 1 and its contents).

The membrane collar 33a of the membrane 33 has a substantially constant cross-section in the z-direction (uniform diameter along the height of the membrane collar). Due to the use of the tool 100 for picking up and holding the membrane, a membrane shoulder of the type known from the prior art is not necessary. Due to a membrane shoulder, the cross-section of the membrane collar is not substantially constant in the z-direction, but the diameter of the membrane collar is enlarged at the upper end thereof in the positive z-direction in comparison with the diameter of the membrane collar area having a constant cross-section. In the prior art, the membrane shoulder is required for holding the membrane, prior to fixing it, in a predefined position on an inner surface of a container, e.g. by positioning the shoulder (membrane shoulder) such that it rests e.g. on a flared rim 1a of a container.

FIGS. 5 and 6 show a container 200 comprising a plurality of compartments 201, 201', 201", $201^x$. The compartments 201, 201', 201" $201^x$ are defined in the container by a plurality of membranes 233, 233', $233^x$. The membranes 233, 233', $233^x$ are here arranged at different axial depths $T_1$, $T_2$, $T_x$ of the inner surface 205 of the container 200.

For attaching a plurality of membranes, a membrane 233 is first fixed by means of a tool 100 to the container inner surface 205 at the axially lowermost position $T_1$. As a result, two compartments 201, 201' are formed. Making use of the tool 100, a second membrane 233' is positioned at and fixed to the container inner surface 205 at an axial depth $T_2$ which is smaller than the axial depth $T_1$ of the first membrane 233. Due to the attaching of the second membrane 233', three compartments 201, 201', 201" are formed, in combination with the membrane 233, inside the container. By attaching additional membranes, further compartments can be formed in the container.

FIG. 6 illustrates, without showing the tool 100, how the membranes can be introduced in the container making use of a tool 100. The membranes 233, 233', 233$^x$ do not comprise any membrane shoulder, which would rest on a flared rim 201a. The membranes 233', 233$^x$, as shown in FIG. 6, comprise pull tabs 240', 240$^x$. The membrane 233x comprises a membrane collar 233xa and a membrane section 233xb, which can be picked up and held by a plate- or disk-shaped positioning element 30.

FIG. 7 shows a tool 100 comprising a force transmission unit 10, a deflection unit 20 and a positioning element 30.

The force transmission unit 10 is configured as a hollow shaft, so that a flow source 15 can be connected to the interior channel 11 at the upper end of the force transmission unit 10. The deflection unit 20 comprises lifting devices 19a, through which rods 18 can be extended (or deflected). Each rod 18 is connected to a positioning or lifting device 19a and a connection element 19, so that by a deflection of the rod 18, caused by the lifting device 19a, a roller 21 can be deflected via a roller axle 17.

The roller axle 17 is connected to the connection element 19, the roller 21 and a cantilever 16a. The cantilever 16a is connected to a disk 12 via a joint 16.

Due to the fact that the rod 17 (roller axle 17) is connected via the cantilever 16a and the joint 16 to the disk 12, the roller 21 will additionally be guided when the rod 18 is deflected. The disk belongs to the deflection unit. In the case of a plurality of rollers, this structural design is provided repeatedly in a circumferentially spaced manner.

The positioning element 30 is plate-shaped and its lower surface has provided therein a plurality of holes 80 through which an interior 32 (not shown) of the positioning element 30 communicates with the surroundings. The interior 32 of the positioning element 30 communicates with a channel 11 of the force transmission unit 10, so that a flow can pass through the positioning element 30, starting from a flow source 15 and continuing via the channel 11 of the force transmission unit 10 and the interior 32 of the positioning element 30.

The force transmission unit 10 is, at least via the circumferentially distributed lifting devices 19a, connected to the deflection unit 20 in a in a rotationally fixed manner, so that a rotation of the force transmission unit 10 will cause a rotation of the deflection unit 20. The positioning element 30 is, with respect to a rotation of the force transmission unit 10 and the deflection unit 20, decoupled from these components, so that a rotation of the force transmission unit and of the deflection unit 20 will not cause a (substantial) rotation of the positioning element 30.

FIG. 8 shows the tool as already described in FIG. 7, but with a different positioning element 30. Instead of holes 80, the positioning element 30 comprises curved slots 90, which are arranged symmetrically. The slots 90 connect the interior 32 (not shown) of the positioning element 30, and the interior 32 is in fluid communication with the channel 11 of the force transmission unit 10, so that a flow can pass through the positioning element 30 via the slots 90, the interior 32 of the positioning element 30 and the channel 11 of the force transmission unit 10.

The slots 90 are quadrant-shaped or semicircular and they are spaced apart radially. Between the ends of the slots, webs remain in order to keep the positioning element stable in the sense of stiff.

FIG. 8a shows a picture from below for quadrant-shaped elements as staggered slots 90.

Figure 1:
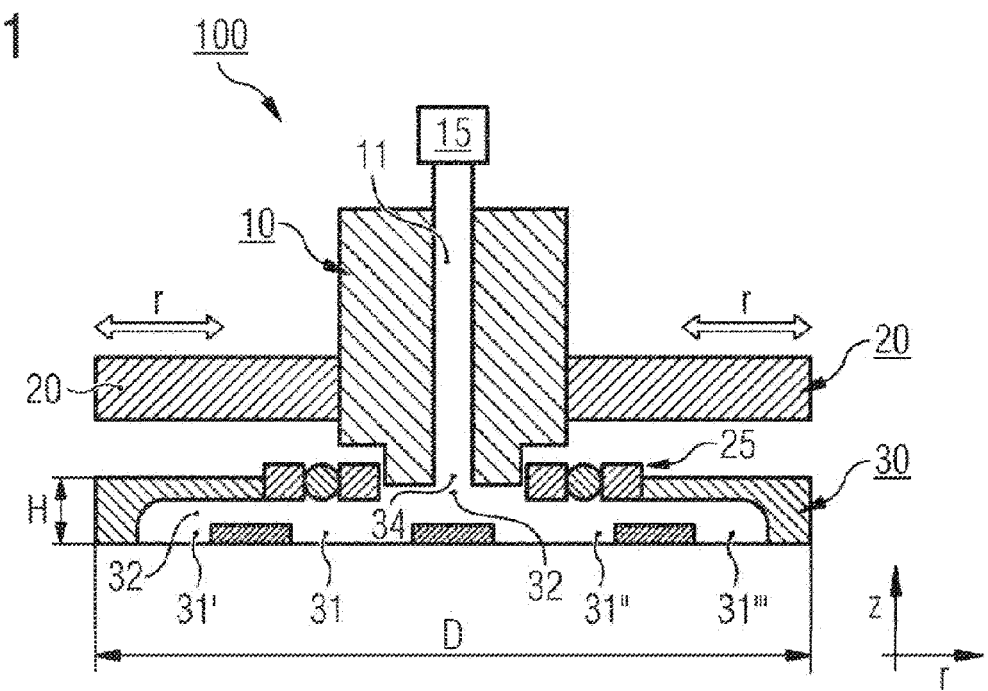
Figure 1A:
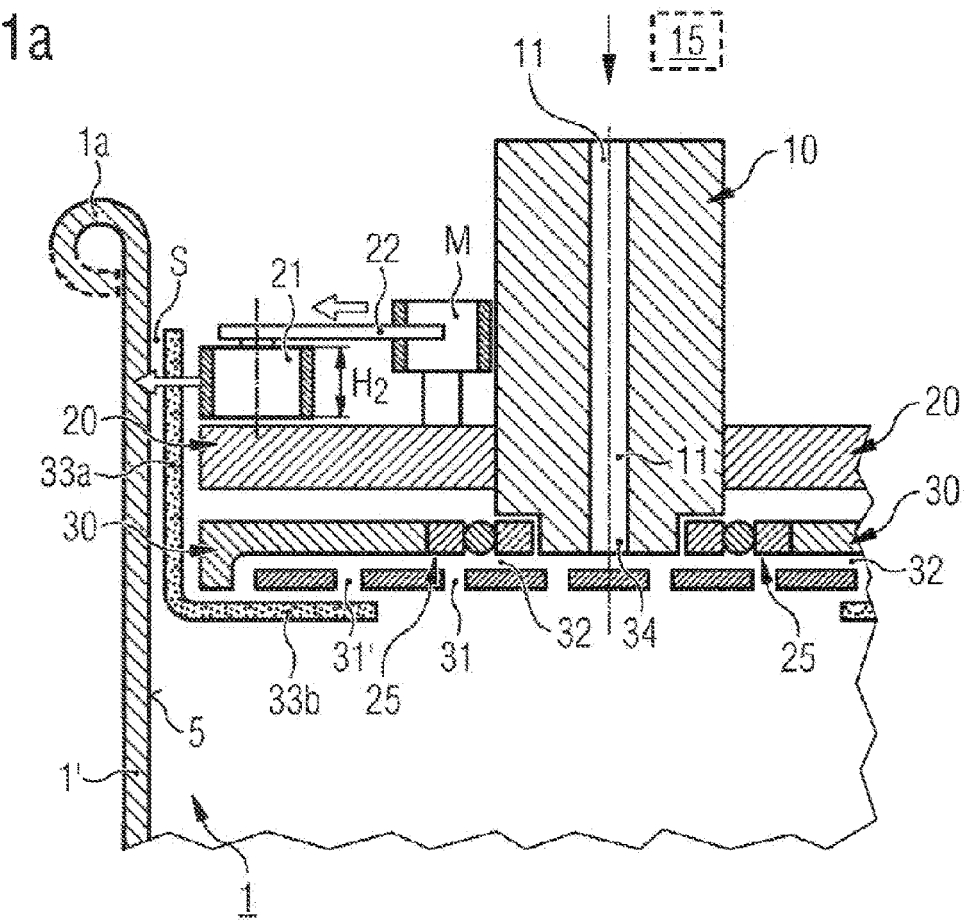
Figure 1B:
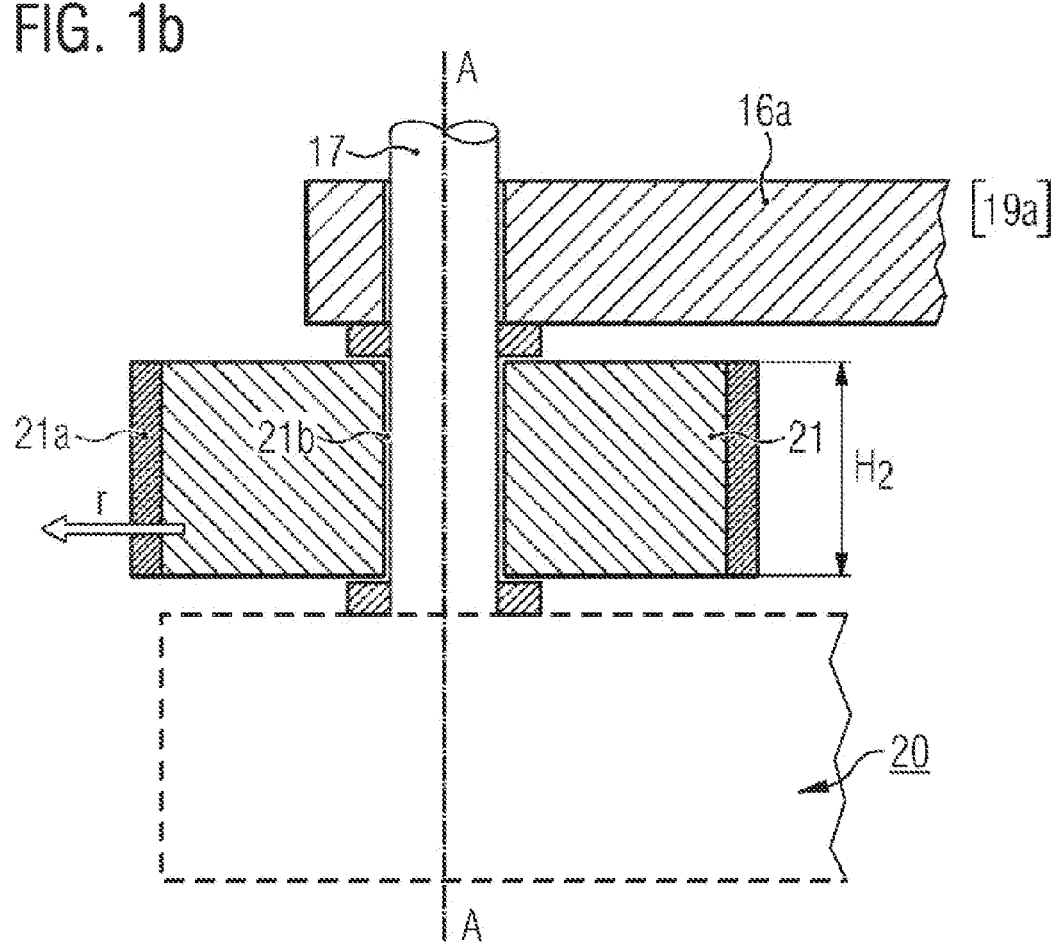
Figure 2A:
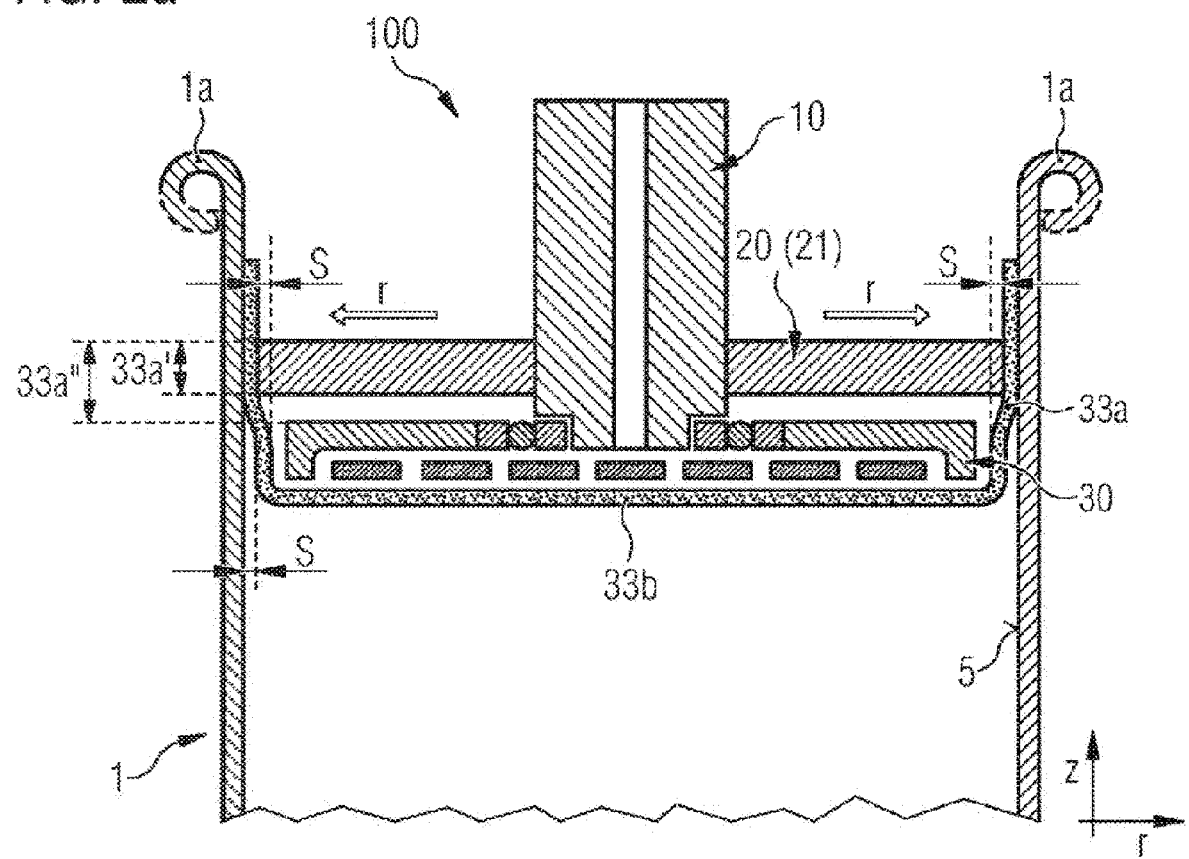
Figure 3:
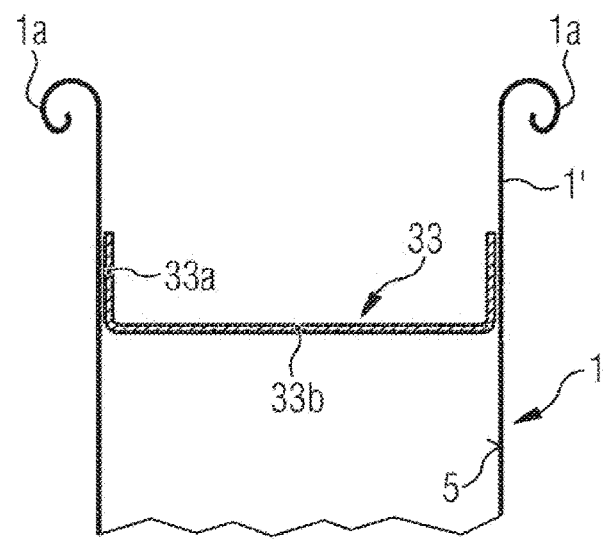
Figure 4:
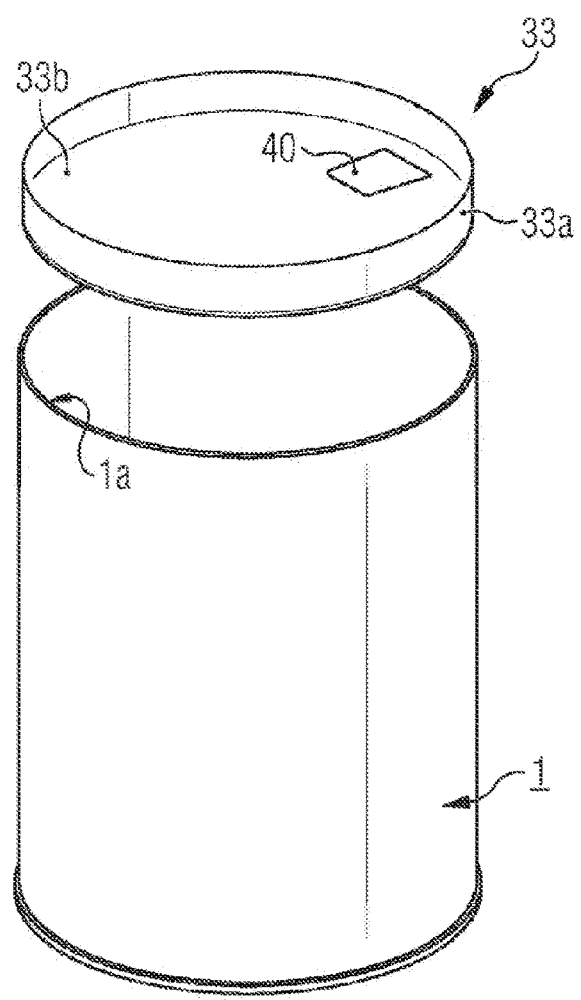
Figure 5:
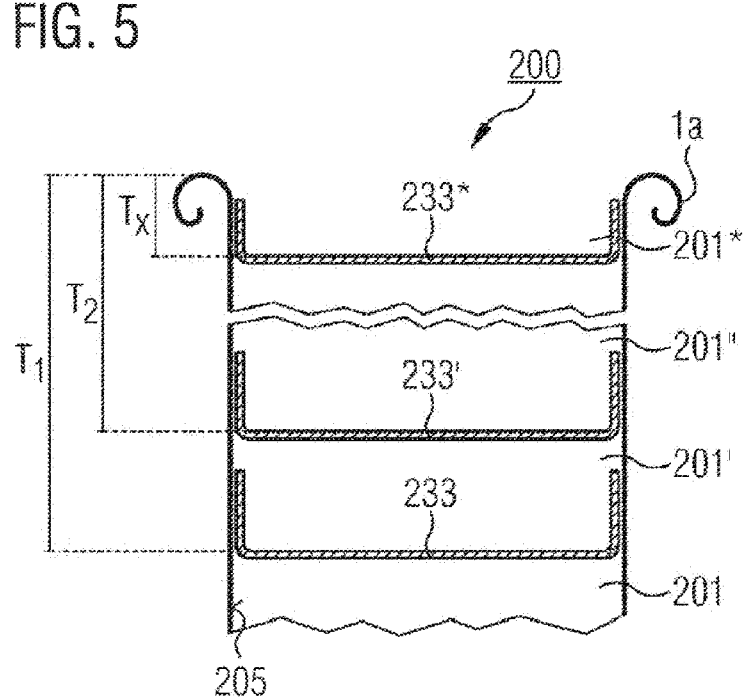
Figure 6:
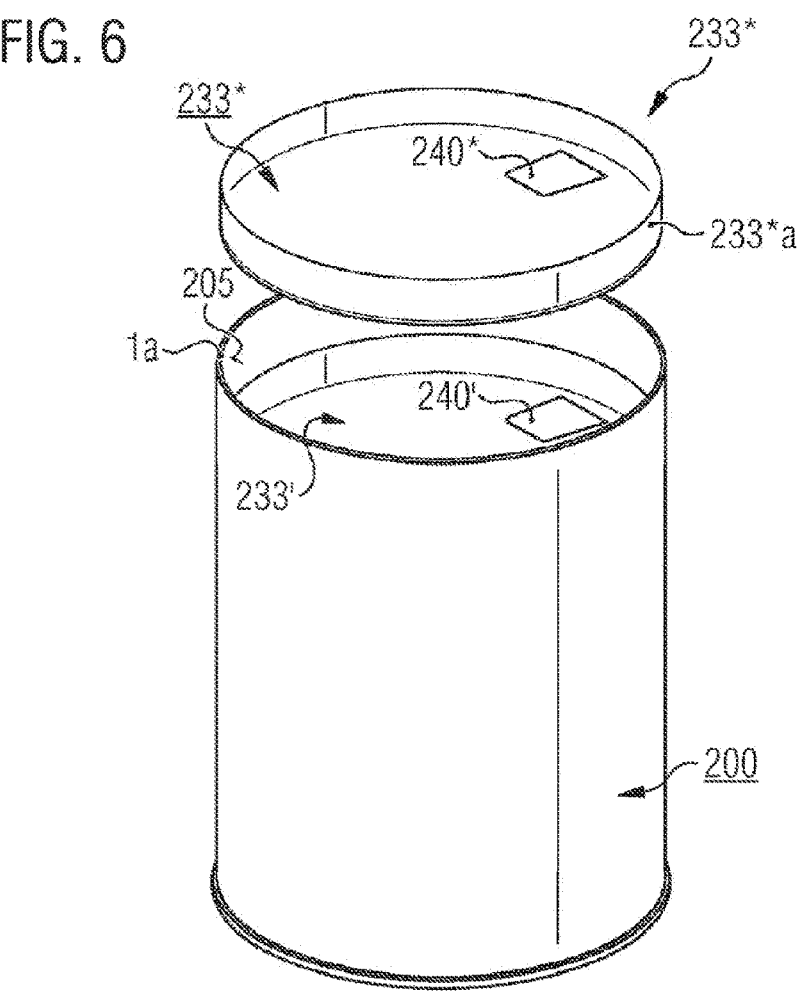
Figure 7:
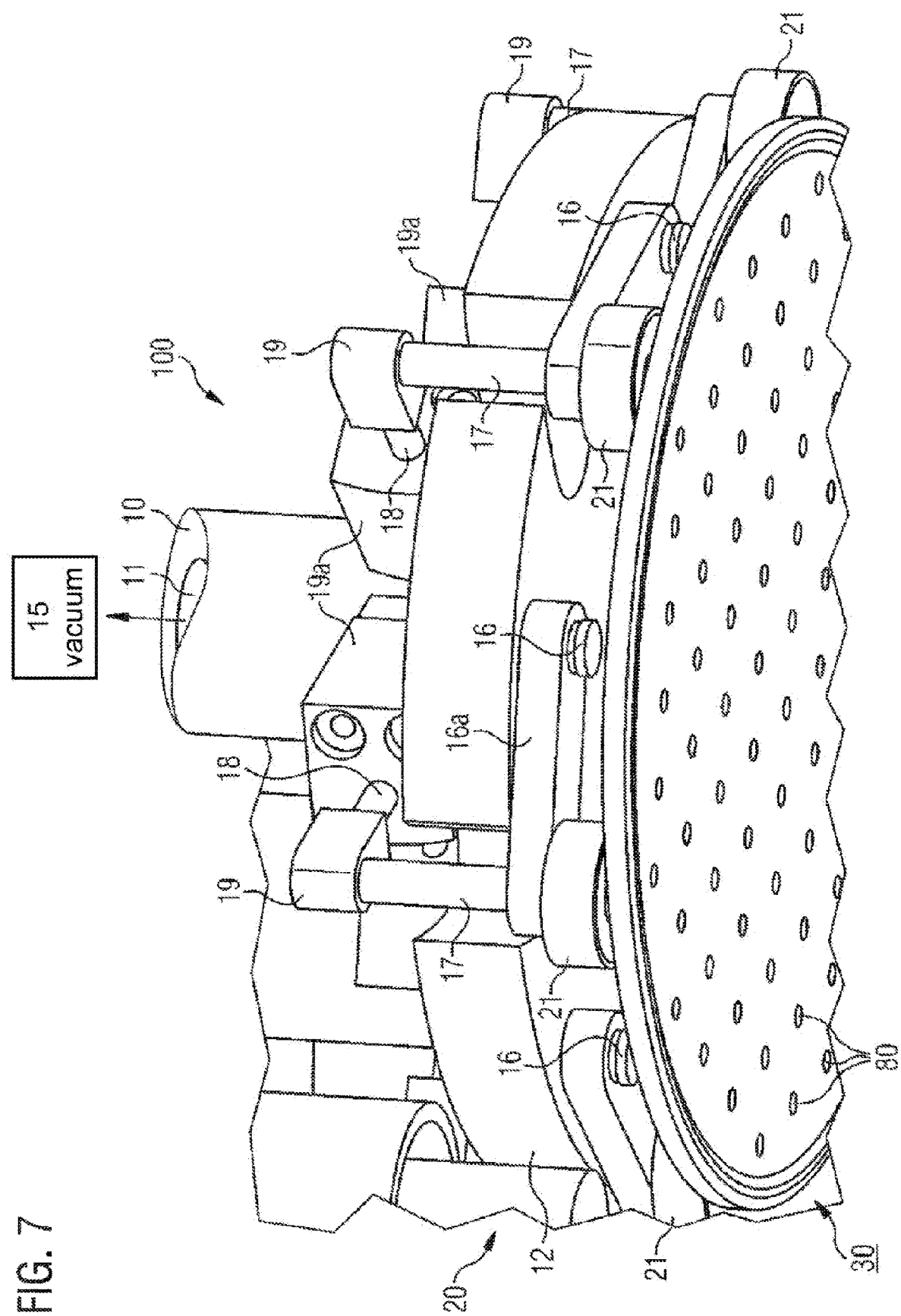
Figure 8:
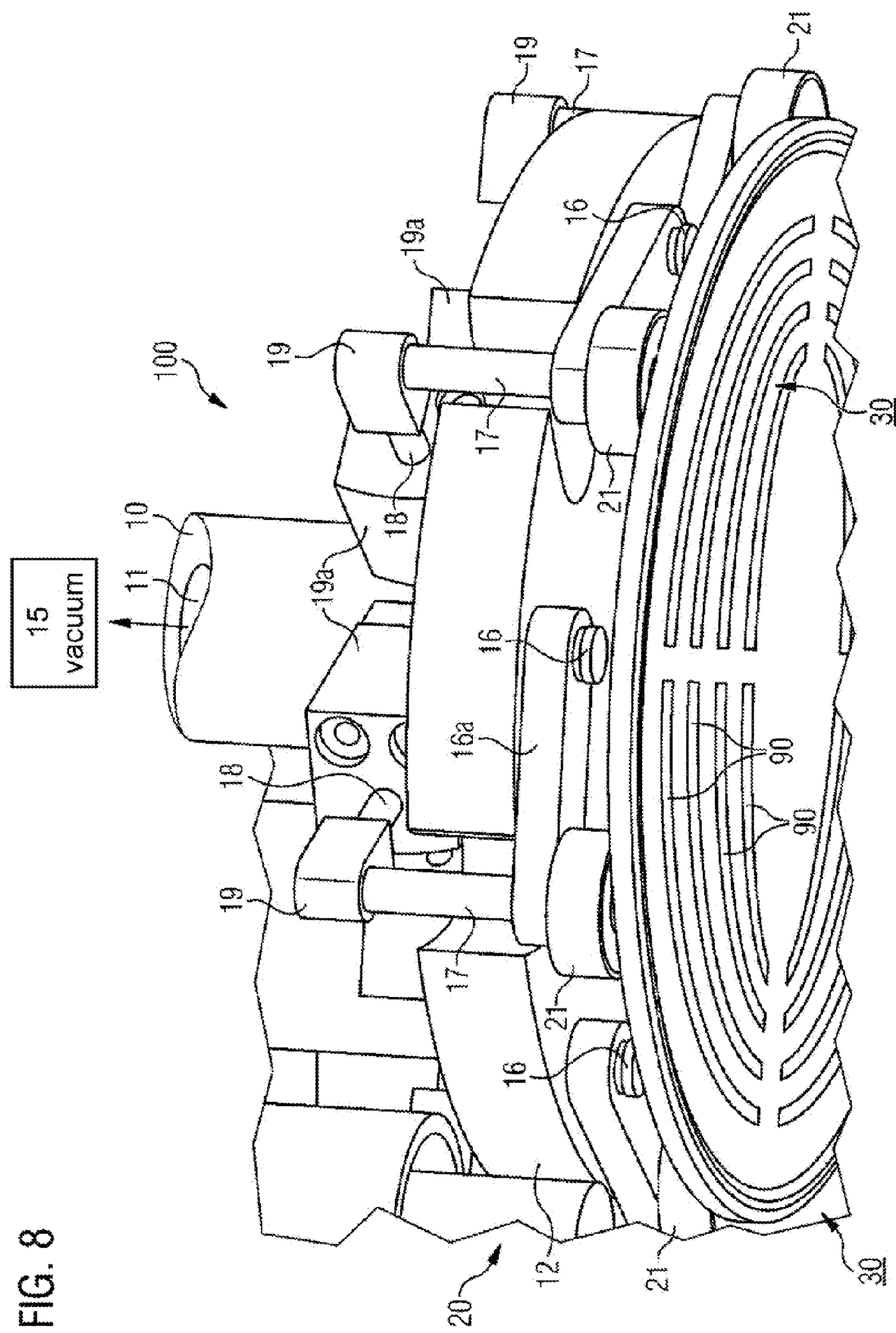
FIG. 8 shows a picture from below for quadrant-shaped elements as staggered slots 90.

What is claimed is:

1. A tool for attaching a membrane to an inner surface of a container, the tool comprising a force transmission unit, a deflection unit and a positioning element, wherein:
   the force transmission unit is coupled to the deflection unit and the positioning element, so that a force can be transmitted from the force transmission unit to the deflection unit or the positioning element;
   at least a portion of the deflection unit is deflectable with a radial component;
   the positioning element is adapted to allow a flow of gas therethrough, so as to pick up and hold the membrane; and
   the deflection unit comprises a roller as a deflectable portion of the deflection unit, the roller being deflectable in a lateral direction.

2. The tool according to claim 1, wherein the force transmission unit is connected to the deflection unit in a rotationally fixed manner, at least one portion of the deflection unit being nevertheless deflectable with a radial component.

3. The tool according to claim 1, wherein the force transmission unit is rotatable relative to the positioning element.

4. The tool according to claim 1, wherein the positioning element has an interior adapted to allow a flow of gas therethrough.

5. The tool according to claim 4, wherein the interior of the positioning element is open towards surroundings via at least a first opening, and is open downwards in the direction of the membrane that can be picked up and held by the positioning element.

6. The tool according to claim 4, wherein the interior of the positioning element is in fluid communication with the force transmission unit via at least a second opening.

7. The tool according to claim 1, wherein the positioning element allows a flow therethrough starting from a flow source, the flow consisting of a fluid.

8. The tool according to claim 1, wherein the deflection unit and the positioning element are rotatable relative to each other.

9. The tool according to claim 1, wherein the force transmission unit is a hollow shaft.

10. The tool according to claim 1, wherein the flow of gas through the positioning element can be created to be strong enough for at least neutralizing a weight force of the membrane.

11. The tool according to claim 10, wherein a central area of the membrane is pressed against or suctionally attracted onto the positioning element by the flow of gas.

12. A tool for attaching a membrane to an inner surface of a container, the tool comprising a force transmission unit, a deflection unit and a positioning element, wherein the positioning element comprises a plurality of distributed openings directed towards the membrane, the membrane being adapted to be held by a pressure difference imparted by the openings, and wherein the force transmission unit is coupled to the deflection unit and the positioning element, configured to transmit a force from the force transmission unit to the deflection unit or the positioning element;
   at least a portion of the deflection unit is deflectable with a radial component; and
   the positioning element is adapted to allow a flow of gas therethrough, so as to pick up and hold the membrane.

13. A tool for attaching a membrane to an inner surface of a container in an airtight manner, the tool comprising a force transmission unit, a deflection unit and a positioning element, wherein:
- the force transmission unit is coupled to the deflection unit and the positioning element, so that a force can be transmitted between the force transmission unit and the deflection unit, the positioning element being decoupled therefrom, so as to be functionally assigned to the membrane;
- the deflection unit having a plurality of portions deflectable therefrom, each on a path with at least one radial component;
- the positioning element allows a flow of gas therethrough, so as to be able to pick up the membrane and hold lowering thereof into the container and axially position the membrane at a given depth, without being supported or held by other elements of the container; and
- by using the plurality of portions of the deflection unit, the membrane can, with at least one axial section of its membrane collar, be pressed against and circumferentially sealed to an inner surface of the wall by deflecting the plurality of portions at the given depth.

14. The tool according to claim 13, wherein the force transmission unit is connected to the deflection unit in a rotationally fixed manner and the deflection unit and the positioning element are adapted to be rotated relative to each other.

15. The tool according to claim 13, wherein the positioning element is round in shape on an outer circumference thereof and resembles a cylinder whose diameter is at least five times larger than its height.

16. The tool according to claim 13, wherein the deflection unit comprises a plurality of rollers as deflectable portions of the deflection unit, wherein the rollers are distributed over the outer edge of the deflection unit and configured as pressure rollers for a collar section of the membrane.

17. The tool according to claim 16, wherein each roller of the plurality of rollers comprises an axial portion having a constant diameter and a height of not more than 30 mm.

18. A tool for attaching a membrane to an inner surface of a container, the tool comprising a force transmission unit, a deflection unit and a positioning element, wherein
- the force transmission unit is coupled to the deflection unit and the positioning element, so that a force can be transmitted from the force transmission unit to the deflection unit or the positioning element;
- the deflection unit comprises a roller that is deflectable with a radial component; and
- the positioning element is adapted to pick up and hold the membrane.

19. The tool of claim 18, wherein the positioning element is adapted to allow a flow of gas therethrough.

* * * * *